United States Patent [19]

Hamermesh et al.

[11] Patent Number: 4,695,619

[45] Date of Patent: * Sep. 22, 1987

[54] INTUMESCENT FLAME-RESISTANT COATING COMPOSITION

[75] Inventors: Charles L. Hamermesh, Westlake Village; Paul J. Dynes, Los Angeles; Peter A. Hogenson, Long Beach, all of Calif.

[73] Assignee: Rockwell International Corporation, El Segundo, Calif.

[*] Notice: The portion of the term of this patent subsequent to Dec. 1, 1998 has been disclaimed.

[21] Appl. No.: 755,872

[22] Filed: Jul. 17, 1985

[51] Int. Cl.[4] .................. B32B 3/26; B32B 27/40; B32B 5/18; B05D 3/02
[52] U.S. Cl. ............................ 528/73; 528/84; 427/244; 427/373; 524/492
[58] Field of Search ............... 528/73, 84; 427/244, 427/373; 524/492

[56] References Cited

U.S. PATENT DOCUMENTS 4,303,727 12/1981 Hamermesh et al. ............. 528/73

Primary Examiner—John Kight
Assistant Examiner—M. L. Moore
Attorney, Agent, or Firm—H. Fredrick Hamann; Craig O. Malin; Max Geldin

[57] ABSTRACT

A polymeric or plastic coating is provided which protects coated structures by forming an intumescent insulative fire resistant barrier. The coating is formed from the product of mixing an aromatic polyisocyanate, an aromatic polycarboxylic compound and about 1 to about 20% by weight of furfuryl alcohol. The structure to be protected is coated with the product of the mixture and the coating is dried. An intumescent polyimide fire resistant foam is formed when the coating is exposed to a (non-flame) heat source at temperature ranging from about 110° C. to about 140° C.

23 Claims, No Drawings

INTUMESCENT FLAME-RESISTANT COATING COMPOSITION

BACKGROUND OF THE INVENTION

1. Field of the Invention

This invention relates to the field of polymeric coatings and particularly to the field of flame-resistant polyimide coatings.

2. Description of the Prior Art

Many structures such as fiberboard or cardboard containers have poor flame resistance. Although their flame resistance can frequently be improved by incorporating additives in the fiberboard formulation, these additives generate toxic volatiles when pyrolyzed. Insulative foam can be attached to the exterior of such structures, but the large volume of the foam reduces the useful space.

Another approach used to improve the flame resistance of structures is to paint them with intumescent coatings. These are paints which contain an intumescing agent. When heated, the paint expands and insulates the structure from the flame by increasing the distance between the flame and the surface of the structure. One intumescent paint which has been reported (NASA Tech Briefs, Summer 1979, page 224) has a fluorocarbon latex resin base plus a pigment and miscellaneous additives. This waterbased paint has approximately 40% of an intumescing agent such as sulfanilamide, melamine pyrophosphate, or polysulfonamide derivatives of polycyclic aromatic compounds.

Prior art intumescent coatings suffer from one or more of several shortcomings. In some cases, a toxic gas is generated during intumescing which increases the hazard to persons present during a fire. Frequently the efficiency of the coating decreases in the presence of moisture because of the ionic character of the intumescent agents used. Additionally, the expanded coating may be weak and friable, causing it to erode rapidly from the structure's surface by the impinging flame and hot gases.

With respect to production of plastic foams, U.S. Pat. No. 3,300,420 to H. E. Frey describes a polyimide foam and a method of producing the foam from aromatic anhydrides and isocyanates. According to the Frey patent, the reactants are mixed together and then heated to 300° F. to about 700° F. to form either a solid foam product or a prepolymerized intermediate useful for forming solid polymeric products.

More recently, U.S. Pat. No. 4,184,021 to Sawko, Riccitiello, and Hamermesh (one of the present inventors) describes a method of preparing a polyimide foam in which the required heating is obtained by including in the reactants furfuryl alcohol and phosphoric acid. During mixing of the reactants, the furfuryl alcohol and phosphoric acid produce a vigorous exothermic reaction which provides the heat that is necessary for the formation of the polyimide structure.

U.S. Pat. No. 4,303,727 to Hamermesh, Tung and Hogenson discloses an intumescent flame-resistant polyimide coating produced from a product resulting from mixing an aromatic polyisocyanate, an aromatic polycarboxylic compound and 25 to 60% furfuryl alcohol at a temperature less than 80° C. When a structure coated with such product is exposed to flame, the coating intumesces to form a flame-resistant foam which protects the structure.

The resulting intumescent coating protects a flammable substrate by expanding and providing a fire-resistant insulative barrier between the fire and the substrate.

However, for an intumescent coating to be useful, it must not foam prematurely when exposed to heat sources (not flame) at relatively low temperatures. Thus, for many applications, it is desirable that the coating should not foam or intumesce when exposed to ambient conditions in a temperature range of about 50° C. to about 110° C.

The coating of above U.S. Pat. No. 4,303,727, although effective and providing a fire-resistant foam, has the disadvantage that such coating has a relatively low kickoff temperature, or temperature of intumescence, of the order of about 80° C. It was believed that such premature foam generation was the result of the formation of polyimide and the generation of carbon dioxide. It now is believed that the reaction which results in such relatively low kickoff temperature apparently is due to the polymerization of furfuryl alcohol in the composition of the patent, which occurs at about such temperature.

SUMMARY OF THE INVENTION

It is an object of the present invention to provide an improved intumescent coating.

Another object of the invention is to provide a structure containing an improved intumescent polyimide coating which has a higher kickoff temperature at intumescence than prior art intumescent coatings.

Yet another object is the provision of an intumescent polyimide coating having a kickoff temperature greater than 110° C., and preferably greater than 120° C.

A still further object is the provision of a method for improving the flame resistance of a structure employing polyimide intumescent coatings.

According to the invention, it has now been discovered that in an intumescent coating composition comprised of a mixture of an aromatic polyisocyanate, an aromatic polycarboxylic compound and furfuryl alcohol, of the general type disclosed in above U.S. Pat. No. 4,303,727, the kickoff temperature of the intumescent coating can be increased by reducing the furfuryl alcohol content below the 25% by weight of the patent composition. By reducing the furfuryl alcohol content to a level such that substantially all of the furfuryl alcohol in the formulation will have reacted with the isocyanate when the coating is applied to the substrate, a substantially higher kickoff temperature of the intumescent coating results.

More specifically, it has been found that by employing furfuryl alcohol in an amount of about 20%, or less, and down to about 1%, and particularly in the range from about 1 to about 10%, by weight of the composition, in the above mixture of an aromatic polyisocyanate and an aromatic polycarboxylic compound, the resulting composition when applied as a coating to a substrate has a kickoff temperature, defined as the temperature at which intumescence commences, which can range from about 110° C., up to about 140° C., substantially higher than the approximately 80° C. kickoff temperature of the intumescent flame-resistant coating of above U.S. Pat. No. 4,303,727.

In a preferred embodiment, about 20 to about 60% of an aromatic polyisocyanate, is mixed with about 10 to about 40% of an aromatic polycarboxcylic compound such as pyromellitic dianhydride and about 1 to about 20% of furfuryl alcohol, by weight. The mixture is then applied to a substrate material such as cardboard and dried at a temperature less than about 90° C. The result is a thin, relatively stable plastic coating having good mechanical properties, and which resists degradation by moisture. When the cardboard is exposed to heat or a flame, such as during a fire, the coating first intumesces at temperature ranging from about 110° C. up to about 140° C., corresponding to the amount of reduction of furfuryl alcohol in the formulation, to form an insulating foam around the cardboard, which remains physically in place and does not crumble upon exposure to further heating or to a flame. The foam aids in insulating the substrate material from the heat of the fire and reduces its burnability.

DETAILED DESCRIPTION OF PREFERRED EMBODIMENTS

An intumescent coating composition is prepared according to the invention by mixing the three essential components, an aromatic polyisocyanate, an aromatic polycarboxcylic compound and furfuryl alcohol, in the range of proportions noted above.

Aromatic polyisocyanates which can be used to prepare the coatings of this invention comprise compounds that contain at least two isocyanate groups and are normally liquid or can become liquid at reaction temperatures. The preferred compounds have at least two aromatic rings with one isocyanate group on each ring. These rings may be connected together as in biphenyl, or interconnected by either carbonyl, sulfone, methylene or oxygen linkages. Examples of suitable compounds are: diphenylmethane-4,4'-diisocyanate, 3-3'-dimethyldiphenyl-methane-4,4'diisocyanate, 3,3'-dimethyldiphenylmethane-4,4'-diisocyanate, biphenyl diisocyanate, diphenylsulfone diisocyanate, and the like. Particularly useful are polymethylenephenylene polyisocyanate, 4,4'-diphenylenemethylene diisocyanate, and polymethylene polyphenylisocyanate. Examples of monophenylene polyisocyanates are toluene diisocyanate, m-phenylene diisocyanate, and xylylene diisocyanate.

The aromatic polycarboxylic compounds which can be used to prepare the coatings of this invention comprise such polycarboxylic compounds as can form intramolecular anhydride and, after reaction with an isocyanate group, imide linkages. Examples of such compounds include the dianhydrides of the following polycarboxylic acids: pyromellitic acid, benzene-1,2,3,4-tetracarboxylic acid, diphenyl-3,3 ', 4-4-tetracarboxylic acid, diphenyl-2,2'3,3'-tetracarboxylic acid, naphthalene-2,3,6,7,-tetracarboxylic acid, naphthalene-1,2,4,5-tetracarboxylic acid, naphthalene-1,4,5,8-tetracarboxylic acid, as well as similar tetracarboxylic derivatives of phenathrene, perylene, diphenyl methane, diphenyl sulfone, diphenyl ether, benzophenone, and the like.

Mixing of the above three components of the formulation is generally carried out at room temperature without applying additional external heating. The resulting mixture is an unfoamed, varnish-like material, which can be applied to any suitable flammable substrate such as cardboard which it is desired to protect against fire.

Air drying the applied coating at room temperature has proven to be satisfactory. However, in some instances it may be advantageous to promote drying by heating.

However, during the steps of mixing, coating and drying, the temperature should be kept below 110° C., preferably below 90° C., to prevent any possible foaming of the mixture.

As previously noted, the amounts of the three essential components in the coating formulation or composition are about 20 to about 60% aromatic polyisocyanate, about 10 to about 40% aromatic polycarboxylic compound and about 1 to about 20% furfuryl alcohol, by weight. However, it has been found particularly that by reducing the amount of furfuryl alcohol in the above composition from about 10% down to about 1%, the kickoff temperature or temperature at which intumescence of the applied coating occurs is markedly increased to from about 120° C. up to about 140° C., with the coating remaining stable up to the kickoff temperature, as contrasted to the low kickoff temperature of about 80° C. for the intumescent coating of above U.S. Pat. No. 4,303,727, employing the minimum 25% by weight furfuryl alcohol of the patent composition.

Thus, when employing for example, 15% or 20% furfuryl alcohol by weight in the above coating composition, the kickoff or foam generation temperature of the coating is about 110° C., which is above the 80° C. kickoff temperature of the coating composition of the above U.S. Pat. No. 4,303,727, employing the minimum 25% furfuryl alcohol therein. However, the kickoff temperature of the coating composition at 7.5% furfuryl alcohol is about 125° C., at 5% furfuryl alcohol about 135° C. and at 1% furfuryl alcohol about 140° C. When employing furfuryl alcohol within the above noted range of 1 to 20%, the applied coating retained good physical properties and stability up to the kickoff temperature for the particular coating, as measured by thermogravimetric tests carried out on the coatings, showing stability of the coating until it reached the kickoff temperature, and showing weight loss of the coating only at the commencement of foaming or intumescence. Thus, by substantially reducing the amount of furfuryl alcohol to within the 1% to 20% weight range noted above, low temperature thermal stability of the coating increases dramatically, and thermal efficiency of the intumescent coating at high temperature above the kickoff temperature, is high.

The intumescent coating compositions of the invention accordingly have good low temperature stability characteristics while having high temperature thermal efficiency, i.e., at temperatures above the kickoff temperature and when exposed to a flame. It has been found that the employment of less than 1% by weight furfuryl alcohol or total removal of furfuryl alcohol from the formulation, results in poor coating application behavior and in poor foaming response when a flame is applied to the coating.

Other materials can be added to the essential components noted above to obtain particular properties for specific applications, without materially affecting the kickoff temperature or stability of the coating. Thus, high temperature thermal performance of the coating composition of the invention can be enhanced by adding a filler, e.g. treated asbestos such as the commercially available material marketed as Zonad by the Zonax Company. Such material confers additional mechanical strength on the coating to ensure that when the coating intumesces and expands as a result of contact by heat or a flame, the resulting char has sufficient strength to remain in place without falling off. Another filler which can be employed is a high purity silica fiber, such as the commercially available material marketed as HP 108, by Manville Corp. The amount of filler employed can range from about 2 to about 15%, by weight, e.g. about 10%.

Other materials which can be added to the coating composition of the invention without adversely affecting the important properties thereof include a surfactant such as a silicone, e.g. Dow Cornings' DC-193 or 195, employed in an amount of about 2 to about 5% by weight, coloring agents, preservatives, stabilizers and other materials in conventional quantities.

Illustrative examples of intumescent coating compositions according to the invention are compositions A through G of Table I below.

TABLE I

| COMPO-NENTS | COMPOSITIONS (grams) | | | | | | |
|---|---|---|---|---|---|---|---|
| | A | B | C | D | E | F | G |
| BTDA | 18.8 | 18.8 | 9.4 | 40.47 | 38.33 | 36.22 | 34.08 |
| PAPI | 25.6 | 25.6 | 12.8 | 51.0 | 48.34 | 45.63 | 42.96 |
| FA | 0.5 | 1.0 | 1.5 | 5.0 | 10.0 | 15.0 | 20.0 |
| DC-193 | 2.0 | 2.0 | 1.0 | 3.53 | 3.33 | 3.15 | 2.96 |
| | 46.9 | 47.4 | 24.7 | 100.00 | 100.00 | 100.00 | 100.00 |
| % FA (by wt.) | 1 | 2.1 | 7.4 | 5 | 10 | 15 | 20 |

An additional 10 grams of Zonad were added to each of compositions D, E, F and G.

BTDA—benzophenone -3 3,3'4,4' tetracarboxylic acid dianhydride
PAPI—polymethylene polyphenylisocyanate
FA—furfuryl alcohol
DC-193—silicone oil surfactant
Zonad—treated asbestos The kickoff or temperature of commencement of intumescence for each of the compositions A to G was determined as described in the following example.

EXAMPLE I

A small quantity of about 5 grams of each of the above dry compositions was heated at a controlled rate of about 10° C. per minute by non-flame heating in an inert atmosphere to prevent oxidation. Weight loss was measured versus temperature at each incremental change in temperature by thermogravimetric analysis. The material in each case remained stable, that is weight of the sample remained constant until a certain temperature was reached, at which weight loss of the sample occurred. This temperature was considered to be the kickoff temperature, indicating chemical change or commencement of intumescence of the composition.

The following Table II shows the kickoff temperatures of compositions A through G.

TABLE II

| Compositions | % by wt. FA | Kickoff Temp. °C. |
|---|---|---|
| A | 1 | 140 |
| B | 2.1 | 140 |
| C | 7.4 | 125 |
| D | 5 | 135 |
| E | 10 | 120 |
| F | 15 | 110 |
| G | 20 | 110 |

Table II above shows the increase in kickoff or intumescing temperature ranging from 120° C. to 140° C. for the intumescent coating compositions A through E of the invention, containing 1 to 10% furfuryl alcohol, and in the case of Compositions F and G, containing 15% and 20% furfuryl alcohol, respectively, the kickoff temperature was 110° C., still substantially above the kickoff temperature of about 80° C. for the composition containing 25% of furfuryl alcohol, disclosed in U.S. Pat. No. 4,303,727. Compositions of the invention containing about 1 to about 7.5% furfuryl alcohol are particularly preferred.

The following are examples of the method of preparation and of the application of the intumescent coating compositions of the invention, it being understood that such examples are only illustrative and are not intended as limitative of the invention.

EXAMPLE II

Polymethylene polyphenylisocyanate (PAPI) is mixed with benzophenone-3,3 '4,4'tetracarboxylic acid dianhydride (BTDA) and with furfuryl alcohol in the amounts of 25.6 grams, 18.8 grans and 1.0 gram, respectively. The three ingredients are mixed at room temperature, with no apparent temperature rise taking place as the result of such mixing. During mixing, 2.0 grams of the silicone surfactant DC-193 of Dow Corning is added to obtain the proper viscosity and control the foaming. The resulting composition corresponds to composition B above, containing 2.1% by weight furfuryl alcohol.

Infrared spectroscopy studies show that all of the furfuryl alcohol reacts with the isocyanate during mixing.

The resulting mixture is an unfoamed varnishlike material which is applied to one side of a cardboard box material at room temperature using a tongue depressor, a short time after the mixture is made. The coating dries on the cardboard at room temperature and adheres thereto.

When external (non-flame) heat is applied to the dried coated surface, the coating expands to form a polyimide foam at the kickoff temperature of about 140° C.

Application of a flame to the expanded coated surface, causes little, if any, burning due to the thermal stability of the imide foam structure of the expanded coating.

The coating applied to the substrate has good resistance to moisture, that is, its kickoff temperature is not adversely affected, by contact with moisture.

EXAMPLE III

A mixture is prepared as described in Example II except that the quantities of PAPI, BTDA, furfuryl alcohol and DC-193, are 51.0, 40.47, 5.0 and 3.53 grams, respectively, corresponding to Composition D of Table 1.

The resulting mixture containing 5% furfuryl alcohol by weight, when applied as a coating to a flammable substrate, as described in Example II, intumesces when heated in the manner noted in Example II, to 135° C.

Continued heating of the resulting polyimide foam intumescent coating by contact with a flame, causes relatively little burning of the foamed coating.

EXAMPLE IV

A mixture is prepared in the manner described in Example II, except that the aromatic polycarboxylic compound is pyromellitic dianhydride (PMDA) instead of BTDA, and employed in the same amount as the BTDA.

Results similar to those in Example II are obtained, including intumescence of the coating at 140° C. and stability of the resulting intumescent polyimide coating to a flame.

EXAMPLE V

Application of a coating as in Example II from a mixture corresponding to Composition C of Table I above, containing 7.4% furfuryl alcohol by weight, results in intumescence at 125° C. and a resulting intumescent coating of high resistance to burning by a flame.

While the above examples utilize polymethylene polyphenylisocyanate (PAPI) and either pyromellitic dianhydride (PMDA) or benzophenone-3,3'4,4'-tetracarboxylic acid dianhydride (BTDA), other aromatic polyisocyanates and aromatic polycarboxylic compounds can be used in the mixture, as previously mentioned.

The coating formulations of the invention can be applied to structures using conventional methods of coating or painting surfaces. For example, surfaces can be coated by brushing, dipping, spraying and rolling. The thickness of the coating can be selected based upon the amount of foamed material needed in the application. If necessary, several coats of the mixture can be applied to obtain the desired thickness.

The mixture can be applied to many different substrates including paper, cardboard, wood, plastic, metals such as aluminum, and fabrics to help protect these substances from burning. Non-combustible substrates such as metals can be coated to increase their effectiveness as a heat barrier, for example fire walls in buildings, in cars, and other structures in which fire can be a problem.

In many applications, the coating can be applied to a structure and not foamed until an emergency (fire) occurs, at which time the coating foams automatically. In other applications, the coating can be applied and then foamed by heating to the kickoff temperature during the manufacture of the part so that the finished structure includes the foam.

From the foregoing, it is seen that the invention provides an improved novel intumescent coating composition which when applied to a flammable substrate forms a stable coating having good mechanical properties and which intumesces at temperatures above about 110° C., substantially higher temperatures than the coating of above U.S. Pat. No. 4,303,727, and forms a polyimide foam which is adherent to the substrate surface and resists degradation while being thermally efficient and providing good flame resistance.

Since variations and modifications of the invention composition and process without departing from the invention concept will occur to those skilled in the art, the invention described herein is not to be taken as limited except by the scope of the appended claims.

What is claimed is:

1. An intumescent fire resistant coating composition comprising about 20 to about 60% of an aromatic polyisocyanate, about 10 to about 40% of an aromatic polycarboxylic compound and about 1 to about 20% furfuryl alcohol, by weight.

2. The coating composition of claim 1, employing about 1 to about 10% furfuryl alcohol, by weight.

3. The coating composition of claim 1, including about 2 to about 5% by weight of a surfactant.

4. The coating composition of claim 3, said surfactant being a silicone oil.

5. The coating composition of claim 1, including about 2 to about 15% by weight of a filler.

6. The coating composition of claim 5, said filler being treated asbestos or high purity silica fiber.

7. The coating composition of claim 1, said polyisocyanate being polymethylene polyphenylisocyanate and said polycarboxylic compound being pyromellitic dianhydride.

8. The coating composition of claim 7, including about 2 to about 5% of a silicone oil surfactant.

9. The coating composition of claim 7, including about 2 to about 15% of a filler selected from the group consisting of treated asbestos and high purity silica fiber.

10. A substrate having a coating which intumesces to form a polyimide foam when heated at temperature ranging from about 110° C. to about 140° C. comprising about 20 to about 60% aromatic polyisocyanate, about 10 to about 40% aromatic polycarboxylic compound and 1 to about 20% furfuryl alcohol, by weight.

11. The structure of claim 10, said coating comprising about 1 to about 10% furfuryl alcohol by weight.

12. The structure of claim 10, said coating including about 2 to about 5% by weight of a surfactant.

13. The structure of claim 10, said coating including about 5 to about 15% by weight of a filler.

14. The structure of claim 10, said polyisocyanate being polymethylene polyphenylisocyanate and said polycarboxylic compound being pyromellitic dianhydride.

15. The structure of claim 12, said surfactant being a silicone oil.

16. The stucture of claim 13, said filler being treated asbestos or high purity silica fiber.

17. A method of improving the flame resistance of a structure comprising
mixing an aromatic polyisocyanate, an aromatic polycarboxylic compound and furfuryl alcohol, in the range of about 20 to about 60% of said polyisocyanate, about 10 to about 40% of said polycarboxylic compound and about 1 to about 20% of said furfuryl alcohol, by weight,
coating a surface of the structure with the product of said mixing step, and
drying said product, said steps of mixing, coating and drying being carried out at less than 90° C., to form a coating which intumesces at temperature ranging from about 110° C. to about 140° C.

18. The method of claim 17, including adding about 2 to about 5% by weight of a surfactant during said mixing step.

19. The method of claim 17, including adding about 2 to about 15% by weight of a filler during said mixing step.

20. The method of claim 17, said polyisocyanate being polymethylene polyphenylisocyanate and said polycarboxylic compound being pyromellitic dianhydride.

21. In an intumescent coating composition containing an aromatic polyisocyanate, an aromatic polycarboxylic compound and furfuryl alcohol, the improvement for increasing the temperature of intumescence of said coating which comprises employing substantially less than 25% by weight of furfuryl alcohol in said composition.

22. The improvement of claim 21, employing about 1 to about 20% by weight of furfuryl alcohol, and increasing the temperature of intumescence to about 110° C. to about 140° C.

23. The improvement of claim 21, employing about 1 to about 10% by weight of furfuryl alcohol, and increasing the temperature of intumescence to about 120° C. to about 140° C.

* * * * *